United States Patent
Inoue (10) Patent No.: US 6,233,108 B1
(45) Date of Patent: May 15, 2001

(54) STORAGE DEVICE WITH THE ABILITY TO CHECK FOR DEFECTS IN SAME

(75) Inventor: Sunao Inoue, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/826,690

(22) Filed: Apr. 7, 1997

(30) Foreign Application Priority Data

Apr. 8, 1996 (JP) .................................................. 8-085533

(51) Int. Cl.[7] ...................................................... G11B 5/02
(52) U.S. Cl. ................................................. 360/53; 360/48
(58) Field of Search ................................. 360/48–49, 54, 360/61, 47, 53; 369/48, 54, 59, 124, 124.01–124.15; 710/5, 7, 8; 714/710, 718, 719, 769, 770

(56) References Cited

U.S. PATENT DOCUMENTS

| | | | |
|---|---|---|---|
| 4,420,807 | * | 12/1983 | Nolta et al. . |
| 4,814,903 | * | 3/1989 | Kulakowski et al. ................ 360/48 |
| 5,025,432 | * | 6/1991 | Naito . |
| 5,465,343 | * | 11/1995 | Henson et al. . |
| 5,894,585 | * | 4/1999 | Inoue et al. . |
| 6,029,209 | * | 2/2000 | Cornaby et al. ......................... 710/5 |

FOREIGN PATENT DOCUMENTS 4-266117    9/1992 (JP) .

OTHER PUBLICATIONS

Patent Abstracts of Japan, vol. 97, No. 7, for JP 9–186833, Jul. 15, 1997.*
Multiple Threads of Execution in REXX Programs, IBM Technical Disclosure Bulletin, vol. 37, No. 8, p. 111, Aug. 1994.

"Detection and Reallocation of Defective Clusters in Removable DASD Media", IBM Technical Disclosure Bulletin, vol. 37, No. 6B, Jun. 1994, US, pp. 571–572.

"Method for Recovering from Runaway Sector Reassingments on Hard Disk Drive", IBM Technical Disclosure Bulletin, vol. 34, No. 7B, Dec. 1991, U.S. pp. 178–179.

"High–Speed Formatting Operation for a Disk File", IBM Technical Disclosure Bulletin, vol. 36, No. 8, Aug. 1993, U.S. pp. 673–674.

"Effective Management Method of Spare Area Allocation for Sector and Cylinder Effects", IBM Technical Disclosure Bulletin, vol. 38, No. 5, May 1995, U.S. pp. 141–142.

"Method for Allocating Spare Sectors after SAT", IBM Technical Disclosure Bulletin, vol. 29, No. 1, Jun. 1986, U.S. pp. 210–214.

* cited by examiner

*Primary Examiner*—W. R. Young
(74) *Attorney, Agent, or Firm*—Fitzpatrick, Cella, Harper & Scinto (57) ABSTRACT

All storage areas constituting a storage medium are checked for defects by successively reading and writing data. If an error that has occurred owing to the checking operation is an error for which retry is possible, the number of times this occurs is accumulated in a retrial-count storage area of a memory. A faulty storage area is detected based upon the type of error that has occurred by checking and/or the number of occurrences that have been accumulated.

13 Claims, 6 Drawing Sheets

PRIOR ART

71 STORAGE DEVICE
72 ORDINARY STORAGE AREA
73 SUBSTITUTE STORAGE AREA
74 SUBSTITUTE-AREA MANAGEMENT AREA
75 DEFECTIVE AREA
76 DEFECTIVE AREA

FIG. 8

STORAGE DEVICE WITH THE ABILITY TO CHECK FOR DEFECTS IN SAME

BACKGROUND OF THE INVENTION

This invention relates to a storage device equipped with a storage medium, a method of controlling the device, a storage system and a method of controlling the storage system.

In a magnetic storage device accommodating a storage medium such as a hard disk, it is usual for the storage medium to have defective storage areas that do not implement the storage function. To deal with a storage area having such a defect, substitution processing is executed. In substitution processing, a substitute storage area is prepared and is substituted for the defective storage area. In addition to substitution processing set when the product is shipped, substitution processing can be performed also with regard to defects that occur afresh during use of the device.

Substitution processing according to the prior art will be described with reference to FIG. 7.

Figure 7:
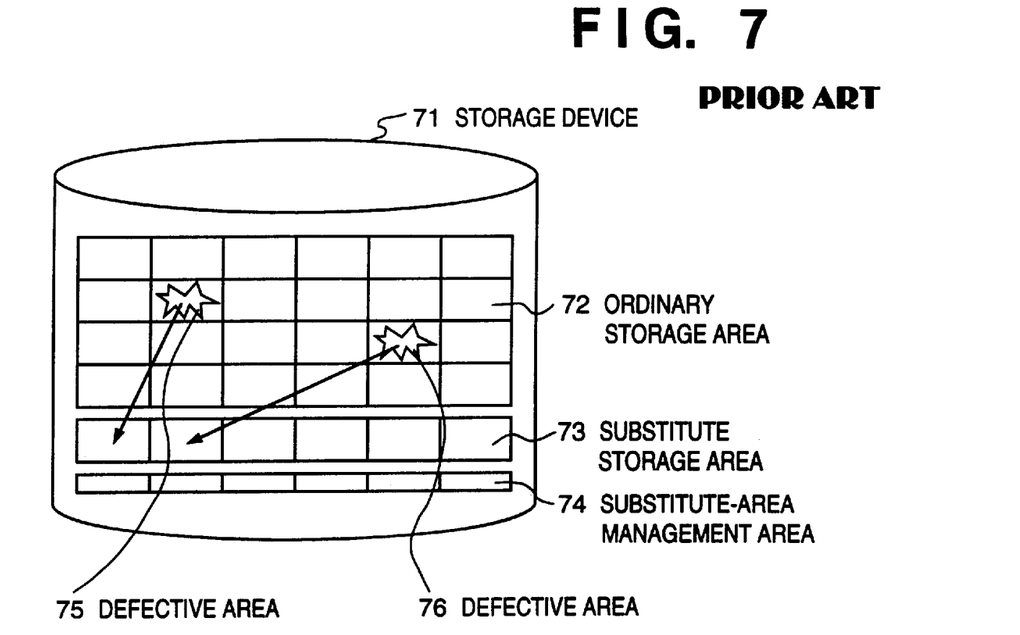
FIG. 7 is a diagram showing the structure of the memory map of a floppy disk storing a program for processing according to the present invention.

Shown in FIG. 7 are a storage device 71 having ordinary storage areas 72 and substitute storage areas 73 set aside in order that substitution processing may be executed if some of the ordinary storage areas 72 develop defects. Shown at 74 is a substitute-area management area (referred to as a "defect list" or the like) for storing information indicating which areas have defects and which of the substitute storage areas 73 have been substituted for them.

Defective areas are of two types, namely a defective area 75 which existed from the outset at shipping of the storage device 71 from the factory, and a defective area 76 which developed subsequently during use of the device. When each of these areas is subjected to substitution processing, the defective area is replaced by a substitute storage area and information relating to the substitution is stored in the substitute-area management area 74.

By way of example, Japanese Patent Application Laid-Open (Kokai) No. 4-266117 describes a storage device in which the storage areas of the storage device are monitored to determine, at reading or writing of data, the number of reading/writing retries and occurrence of errors per each storage area. By recording the number of read/write retries associated with each storage area of the storage device, storage areas deemed to be likely to fail or storage areas in which defects have occurred during use can be replaced by substitute storage areas automatically.

However, with the conventional storage device of this kind, substitution processing for dealing with defects that have occurred anew during use of the device is executed in response to an instruction from the user.

Further, as described in Japanese Patent Application Laid-Open No. 4-266117, the detection and prediction of the occurrence of defects is limited to storage areas actually accessed. More specifically, the detection and prediction of defects in storage areas is not carried out with regard to storage areas currently vacant and unused but to which data are likely to be written in the future or with regard to storage areas in which data exist but which will not be read or written for an extended period of time.

Another problem is that satisfactory detection and prediction of the occurrence of defects cannot be carried out because such detection and prediction is performed only when a read instruction or write instruction is implemented as an actual accessing operation.

SUMMARY OF THE INVENTION

Accordingly, an object of the present invention is to provide a storage device, a method of controlling the same and a storage system in which the detection and prediction of the occurrence of defects in all storage areas of the storage device can be performed accurately and automatically, and in which a storage area that has become defective can be replaced by another storage area automatically.

A further object of the present invention is to provide a storage device, a method of controlling the same and a storage system in which accessing as by an ordinary read instruction or write instruction can be executed while detection and prediction of the occurrence of defects in storage areas is carried out.

According to the present invention, the foregoing objects are attained by providing a storage device equipped with a storage medium, comprising checking means for checking for defects in storage areas by performing reading and writing of data over all storages areas constituting the storage medium, accumulating means which, when an error that has occurred by checking performed by the checking means is an error for which retry is possible, is for accumulating the number of times this has occurred, and detecting means for detecting fault locations in the storage areas based upon the type of error that has occurred by checking performed by the checking means or the number of occurrences accumulated by the accumulating means.

In a preferred embodiment, the device further comprises substitution means for substituting another storage area for a storage area having a defect detected by the detecting means. Providing the substitution means makes it unnecessary for the substitution to be performed by the user.

In a preferred embodiment, the detecting means detects a storage area under examination as being a defective location if the number of occurrences accumulated by the accumulating means exceeds a predetermined number or if the error that has occurred by checking performed by the checking means is an error for which retry is impossible.

In a preferred embodiment, the storage device has a control instruction for checking for defects in storage areas by performing control in such a manner that instructions from elsewhere are not accepted during execution of checking by the checking means, wherein the checking means checks for defects in the storage areas using this control instruction. By employing this control instruction, storage areas other than storage areas being checked are capable of accepting instructions from elsewhere.

In a preferred embodiment, the storage device further comprises holding means for holding data read out by the checking means, wherein the checking means checks for defects of the storage areas by re-reading data out of a storage area after it has been checked by the checking means and comparing the read data and the data held by the holding means. Adopting this arrangement makes it possible to improve the accuracy of the check performed by the checking means.

In a preferred embodiment, the check performed by the checking means is executed at predetermined times.

According to the present invention, the foregoing objects are attained by providing a storage system equipped with a plurality of storage devices, comprising checking means for checking for defects in storage areas by performing reading and writing of data over all storages areas constituting a storage medium provided in each storage device of the plurality thereof, accumulating means which, when an error that has occurred by checking performed by the checking means is an error for which retry is possible, is for accumulating the number of times this has occurred, detecting means for detecting fault locations in the storage areas based upon the type of error that has occurred by checking performed by the checking means or the number of occurrences accumulated by the accumulating means, monitoring means for monitoring status of detection of each storage device of the plurality thereof by the detecting means, and substitution means for substituting one storage device for another in dependence upon status of detection monitored by the monitoring means.

According to the present invention, the foregoing objects are attained by providing a method of controlling a storage device equipped with a storage medium, comprising a checking step of checking for defects in storage areas by performing reading and writing of data over all storages areas constituting the storage medium, an accumulating step which, when an error that has occurred by checking performed at the checking step is an error for which retry is possible, is a step of accumulating the number of times this has occurred, and a detecting step of detecting fault locations in the storage areas based upon the type of error that has occurred by checking performed at the checking step or the number of occurrences accumulated at the accumulating step.

According to the present invention, the foregoing objects are attained by providing a method of controlling a storage system equipped with a plurality of storage devices, comprising a checking step of checking for defects in storage areas by performing reading and writing of data over all storages areas constituting a storage medium provided in each storage device of the plurality thereof, an accumulating step which, when an error that has occurred by checking performed at the checking step is an error for which retry is possible, is a step of accumulating the number of times this has occurred, a detecting step of detecting fault locations in the storage areas based upon the type of error that has occurred by checking performed at the checking step or the number of occurrences accumulated at the accumulating step, a monitoring step of monitoring status of detection of each storage device of the plurality thereof at the detecting step, and a substitution step of substituting one storage device for another in dependence upon status of detection monitored at the monitoring step.

According to the present invention, the foregoing objects are attained by providing a computer readable memory storing program codes of control processing for controlling a storage device equipped with a storage medium, the memory comprising a program code of a checking step of checking for defects in storage areas by performing reading and writing of data over all storages areas constituting the storage medium, a program code of an accumulating step which, when an error that has occurred by checking performed at the checking step is an error for which retry is possible, is a step of accumulating the number of times this has occurred, and a program code of a detecting step of detecting fault locations in the storage areas based upon the type of error that has occurred by checking performed at the checking step or the number of occurrences accumulated at the accumulating step.

Thus, in accordance with the present invention, as described above, it is possible to provide a storage device, a method of controlling the same and a storage system in which the detection and prediction of the occurrence of defects in all storage areas of the storage device can be performed accurately and automatically, and in which a storage area that has become defective can be substituted by another storage area automatically.

Further, it is possible to provide a storage device, a method of controlling the same and a storage system in which accessing as by an ordinary read instruction or write instruction can be executed while detection and prediction of the occurrence of defects in storage areas is carried out.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will be described in detail with reference to the drawings.

Figure 1:
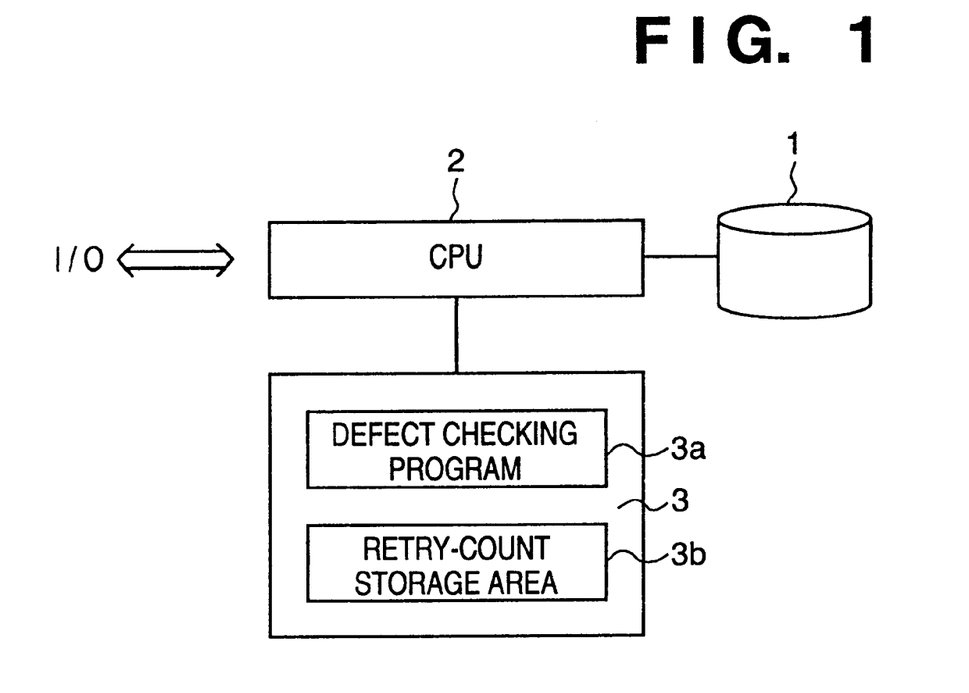
FIG. 1 is a block diagram illustrating a preferred system for implementing a storage device according to a first embodiment of the present invention.

FIG. 1 is a block diagram illustrating a preferred system for implementing a storage device according to a first embodiment of the present invention.

Shown in FIG. 1 are a storage device 1 comprising a storage medium such as a hard disk, a CPU (central processing unit) 2 for subjecting the elements of the system to various control, and a memory 3. The memory 3 includes a defect checking program 3a for executing processing described in the first embodiment, and a retry-count storage area 3b. It is assumed that the detailed construction of the storage device 1 is similar to that of the storage device 71 shown in FIG. 7.

The processing executed in accordance with the first embodiment will now be described with reference to the flowchart of FIG. 2.

Figure 2:
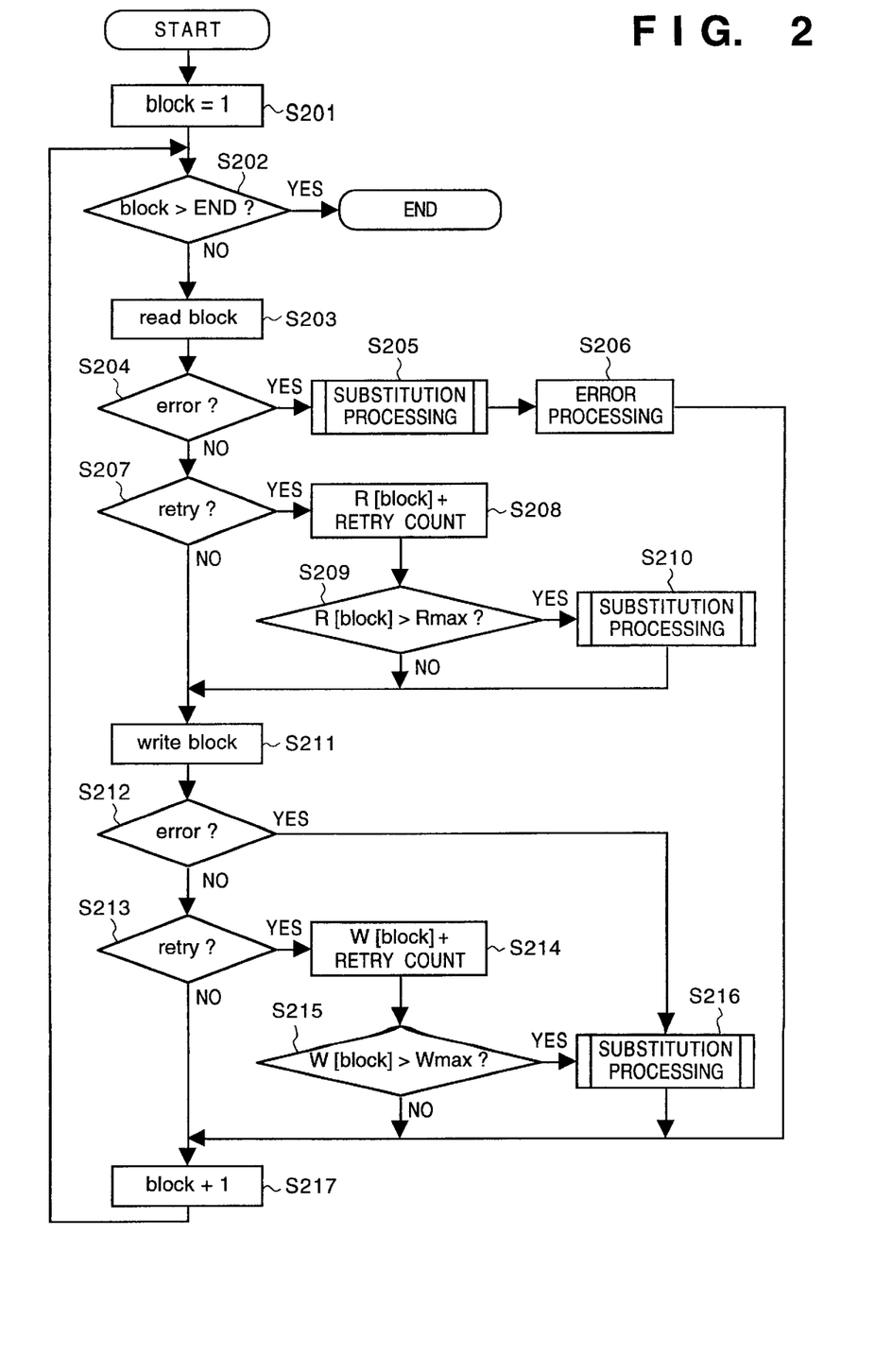
FIG. 2 is a flowchart illustrating the flow of processing executed according to the first embodiment.

FIG. 2 is a flowchart illustrating the flow of processing executed according to the first embodiment.

First, in outline, data stored in each of the plurality of storage areas of storage device 1 are read out of each area successively in response to a read instruction and occurrence of a defect in a storage area owing to the read instruction is detected or predicted. If a defect is detected, substitution processing is executed. Further, data read out of each area in response to the read instruction are written to each corresponding storage area successively in response to a write instruction, and occurrence of a defect in a storage area owing to the write instruction is detected or predicted. If a defect is detected, substitution processing is executed.

Further, the number of retries for reading storage areas of the storage device 1 in response to the read instruction is stored and, if the number of retries in regard to a storage area exceeds a predetermined threshold value, this storage area is subjected to substitution processing. A similar operation is performed with regard to the write instruction as well.

It should be noted that each of the plurality of storage areas is assigned a number for distinguishing the storage area. Detection and prediction of the occurrence of a defect in each area is performed in the order of these numbers.

The details of the above-mentioned processing will now be described.

Step S201 in FIG. 2 calls for initialization, to "1", of a counter "block", which counts the numbers of the storage areas that undergo defect detection and prediction. This is followed by step S202, at which it is determined whether all storage areas have undergone defect detection and prediction processing. If defect detection and prediction is finished for all storage areas ("YES" at step S202), then processing is terminated. If defect detection and prediction is not finished for all storage areas ("NO" at step S202), then the program proceeds to step S203.

Data stored in a storage area corresponding to content indicated by the counter "block" are read out by a read instruction (read block) at step S203. If data cannnot be read out at the first operation, retry is carried out by the system. This is followed by step S204, at which it is determined whether the storage area for which the data read operation was performed in response to the read instruction has developed an unrecoverable error (referred to as an "unrecoverable readout error") even when readout is retried. If such an error has occurred ("YES" at step S204), then the program proceeds to step S205, where substitution processing is executed. This is followed by step S206, at which error processing such as issuance of an error warning is executed. The program then returns to step S203, at which next storage area undergoes defect detection and prediction processing. It should be noted that the unrecoverable readout error is a fatal error in which data that have been stored in the storage area are lost.

If it is found at step S204 that an error has not occurred ("NO" at step S204), then the program proceeds to step S207. Here it is determined whether reading of this storage area in response to the read instruction is retried or not. If retry is carried out ("YES" at step S207), the program proceeds to step S208. If retry is not carried out ("NO" at step S207), then the program proceeds to step S211.

With regard to a storage area from which reading is retried in response to the read instruction, step S208 calls for incrementing of the content of an adding counter R[block] (block=n, where n is the nth storage area) which counts up the number of retries (retry count) in response to the read instruction. Next, at step S209, it is determined whether the content of the adding counter R[block] is greater than a maximum retry count Rmax that has been set in advance. If the content of the adding counter R[block] is greater than the maximum retry count Rmax ("YES" at step S209), then the program proceeds to step S210, at which this storage area undergoes substitution processing. If the content of the adding counter R[block] is equal to or less than the maximum retry count Rmax ("NO" at step S209), on the other hand, then the program proceeds to step S211.

The data that have been read out by the read instruction at step S203 are written to the corresponding storage area at step S211 in response to a write instruction (write block). This is followed by step S212, at which it is determined whether the storage area for which the data write operation was performed in response to the write instruction has developed an unrecoverable error (referred to as an "unrecoverable write error") even when writing is retried. If such an error has occurred ("YES" at step S212), then the program proceeds to step S216, where substitution processing is executed. If an error has not occurred ("NO" at step S212), on the other hand, then the program proceeds to step S213.

It is determined at step S213 whether writing of this storage area in response to the write instruction is to be retried or not. In case of retry ("YES" at step S213), the program proceeds to step S214. If retry is not to be carried out ("NO" at step S213), then the program proceeds to step S217.

With regard to a storage area from which writing is to be retried in response to the write instruction, step S214 calls for incrementing of the content of an adding counter W[block] (block=n, where n is the nth storage area) which counts up the number of retries (retry count) in response to the write instruction. Next, at step S215, it is determined whether the content of the adding counter W[block] is greater than a maximum retry count Wmax that has been set in advance. If the content of the adding counter W[block] is greater than the maximum retry count Wmax ("YES" at step S215), then the program proceeds to step S216, at which this storage area undergoes substitution processing. If the content of the adding counter W[block] is equal to or less than the maximum retry count Wmax ("NO" at step S215), on the other than, then the program proceeds to step S217.

The content of the counter "block" is incremented at step S217, whence the program returns to step S202. The processing described in connection with steps S202~S217 is repeated until detection and prediction of occurrence of defects is finished for storage areas. When all storage areas have been subjected to detection and prediction of defect occurrence, processing is terminated.

The content of the adding counter R[block] and W[block] may be stored in the retry-count storage area of the memory 3 shown in FIG. 1 or in a prescribed storage area of the storage device 1.

In accordance with the first embodiment, as described above, each of the plurality of storage areas constituting the storage device 1 undergo reading and writing of data in response to read/write instructions successively and all storage areas can be automatically subjected to processing for detecting and predicting the occurrence of defective areas in response to the read/write instructions. If a defect is detected, substitution processing can be executed automatically.

Further, the number of retries of the read/write instructions is stored in regard to the storage areas of the storage device 1 and, if the number of retry count regarding a storage area has exceeded a predetermined threshold value, this storage area can be subjected to substitution processing automatically.

As a result of the operation described above, partial defects present in the plurality of storage areas constituting the storage device 1 can be detected and predicted automatically.

<Second Embodiment>

In the first embodiment, storage areas can be automatically subjected to processing for detecting and predicting the occurrence of defects in response to read/write instructions by writing data, which have been read out of a storage area, to the same storage area. However, if, during execution of an initial read instruction and the ensuing write instruction with regard to a certain storage area the same storage area is subjected to a write operation by the user, the data that have been written by the user will be destroyed by the ensuing write instruction in the arrangement described in the first embodiment. Accordingly, in the first embodiment, it is required that the defect detection and prediction applied to storage areas of the storage device be executed under conditions in which the user is not present or under conditions in which other write instructions initiated by the user are forbidden. In other words, a problem with the first embodiment is that ordinary accessing cannot be carried out while detection and prediction of the occurrence of defects is being implemented.

Accordingly, in a second embodiment of the invention, an "inseparable read/write instruction" (ARDWR: Atomic ReaD/WRite) is introduced with respect to disk read/write. The ARDWR instruction allows read/write instructions to be executed successively without interruption. In other words, until execution of a read/write instruction implemented by the ARDWR instruction is finished, an interrupt by another instruction is forbidden. The other instruction is executed only after execution of the ARDWR instruction is completed. More specifically, with regard to a storage area for which defect detection and prediction has not been executed by the ARDWR instruction, another instruction such as an ordinary read instruction or write instruction can be executed. As a result, it is possible to subject storage areas to defect detection and prediction processing even if the user is present or even if another write instruction entered by the user is not forbidden.

This may readily be implemented by extending the command system of an SCSI (Small Computer System Interface), which is a standard for connecting computer peripherals. It is also possible to implement the foregoing on the software level.

Further, a buffer (memory) area equivalent to one block of a storage area is prepared in order to implement the ARDWR instruction. When the ARDWR instruction is applied to a certain storage area, the data that have been stored in this area are read out, the read data are held in the above-mentioned buffer temporarily and the held data are written again to the same storage area to which the ARDWR instruction was applied. Since the data read out of a certain storage area are written to this storage area after first being placed in the buffer, the stored data will not undergo any change after issuance of the ARDWR instruction.

The processing executed in the second embodiment will now be described with reference to the flowchart of FIG. 3.

Figure 3:
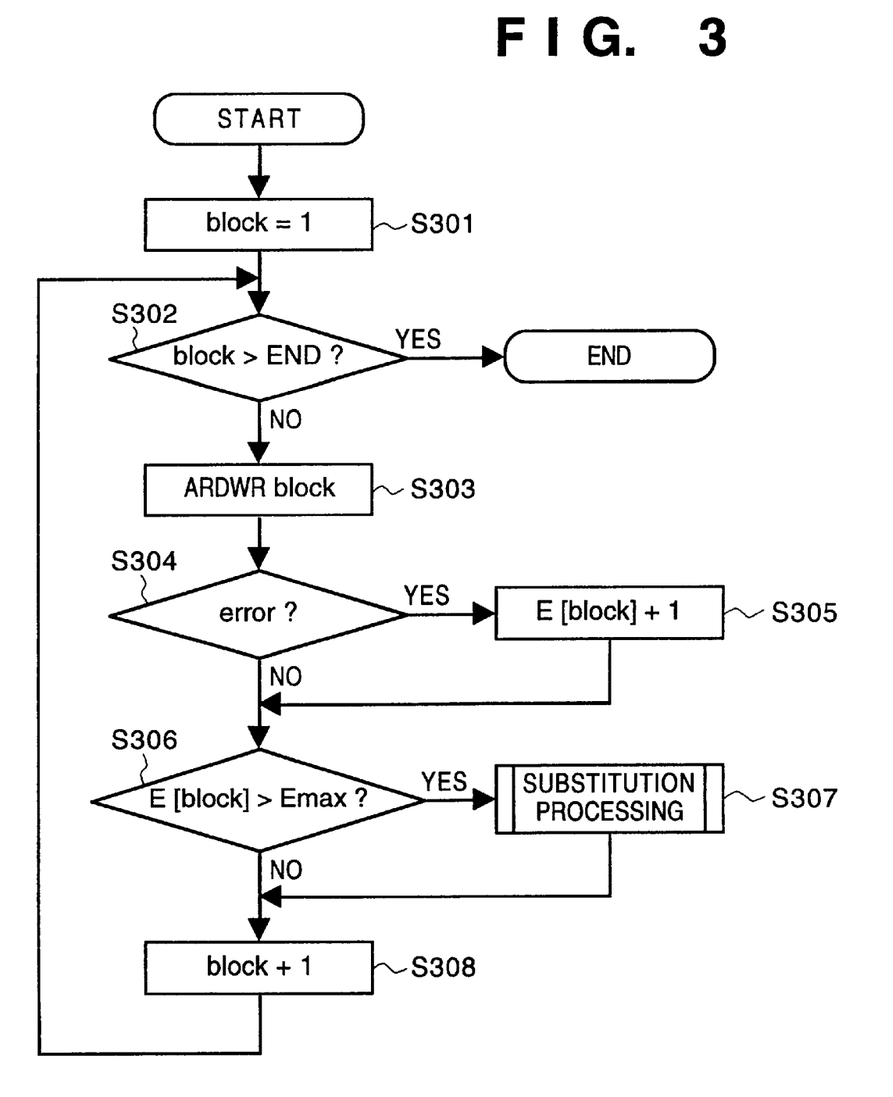
FIG. 3 is a flowchart illustrating the flow of processing executed according to a second embodiment of the invention.

FIG. 3 is a flowchart illustrating the flow of processing executed according to the second embodiment.

In response to the ARDWR instruction, a counter "block", which counts the numbers of the storage areas that undergo defect detection and prediction, is initialized to "1" at step S301. This is followed by step S302, at which it is determined whether all storage areas have undergone defect detection and prediction processing. If defect detection and prediction is finished up to the final storage area ("YES" at step S302), then processing is terminated. If defect detection and prediction is not finished for all storage areas ("NO" at step S302), then the program proceeds to step S303.

At step S303, data stored in a storage area corresponding to content indicated by the counter "block" are read out by the ARDWR instruction (ARDWR block), the data are placed in a buffer temporarily and then written back to the same storage area. This is followed by step S304, at which it is determined whether the storage area for which the data read/write operation was performed in response to the ARDWR instruction has developed a recoverable error (referred to as a "recoverable ARDWR error") owing to retry of the storage area. If such an error has occurred ("YES" at step S304), then the program proceeds to step S305. If it is found at step S304 that an error has not occurred ("NO" at step S304), then the program proceeds to step S306.

With regard to a storage area for which an error has occurred owing to the ARDWR instruction, step S305 calls for incrementing of the content (block=n, where n is the nth storage area) of an adding counter E[block] which counts up the number of times the error has occurred owing to the ARDWR instruction. Next, at step S306, it is determined whether the content of the adding counter E[block] is greater than a cumulative error count Emax that has been set in advance. If the content of the adding counter E[block] is greater than the cumulative error count Emax ("YES" at step S306), then the program proceeds to step S307, at which this storage area undergoes substitution processing. If the content of the adding counter E[block] is equal to or less than the cumulative error count Emax ("NO" at step S306), on the other hand, then the program proceeds to step S308.

The content of the counter "block" is incremented at step S308, whence the program returns to step S302. The processing described in connection with steps S302~S308 is repeated until detection and prediction of occurrence of defects is finished for storage areas. When all storage areas have been subjected to detection and prediction of defect occurrence, processing is terminated.

It should be noted that the content of the adding counter E[block] may be stored in the retry-count storage area of the memory 3 shown in FIG. 1 or in a prescribed storage area of the storage device 1.

In accordance with the first embodiment, as described above, each of the plurality of storage areas constituting the storage device 1 can undergo reading and writing of data in response to the ARDWR instruction successively without an interruption caused by another write instruction, and storage areas can be automatically subjected to processing for detecting and predicting the occurrence of defective areas in response to the ARDWR instruction. If a defect is detected, substitution processing can be executed automatically.

Further, it is possible to subject storage areas to defect detection and prediction processing even if the user is absent or even if another write instruction entered by the user is not forbidden.

Further, the number of times errors occur with regard to storage areas of the storage device in response to the ARDWR instruction can be stored and, if the error count exceeds a predetermined threshold value with regard to a particular storage area, this storage area can be subjected to substitution processing automatically.

As a result of the operation described above, partial defects present in the plurality of storage areas constituting the storage device 1 can be detected and predicted automatically.

<Third Embodiment>

In a third embodiment of the invention, the arrangement of the second embodiment is so adapted that after the ARDWR instruction is executed, data are again read out of the storage area, to which the ARDWR instruction was applied, in response to a read instruction and these data are compared with the data that were read out by the ARDWR instruction. This makes it possible to detect and predict even more accurately the occurrence of defects in the storage areas of the storage device.

The processing executed in the third embodiment will now be described with reference to the flowchart of FIG. 4.

Figure 4:
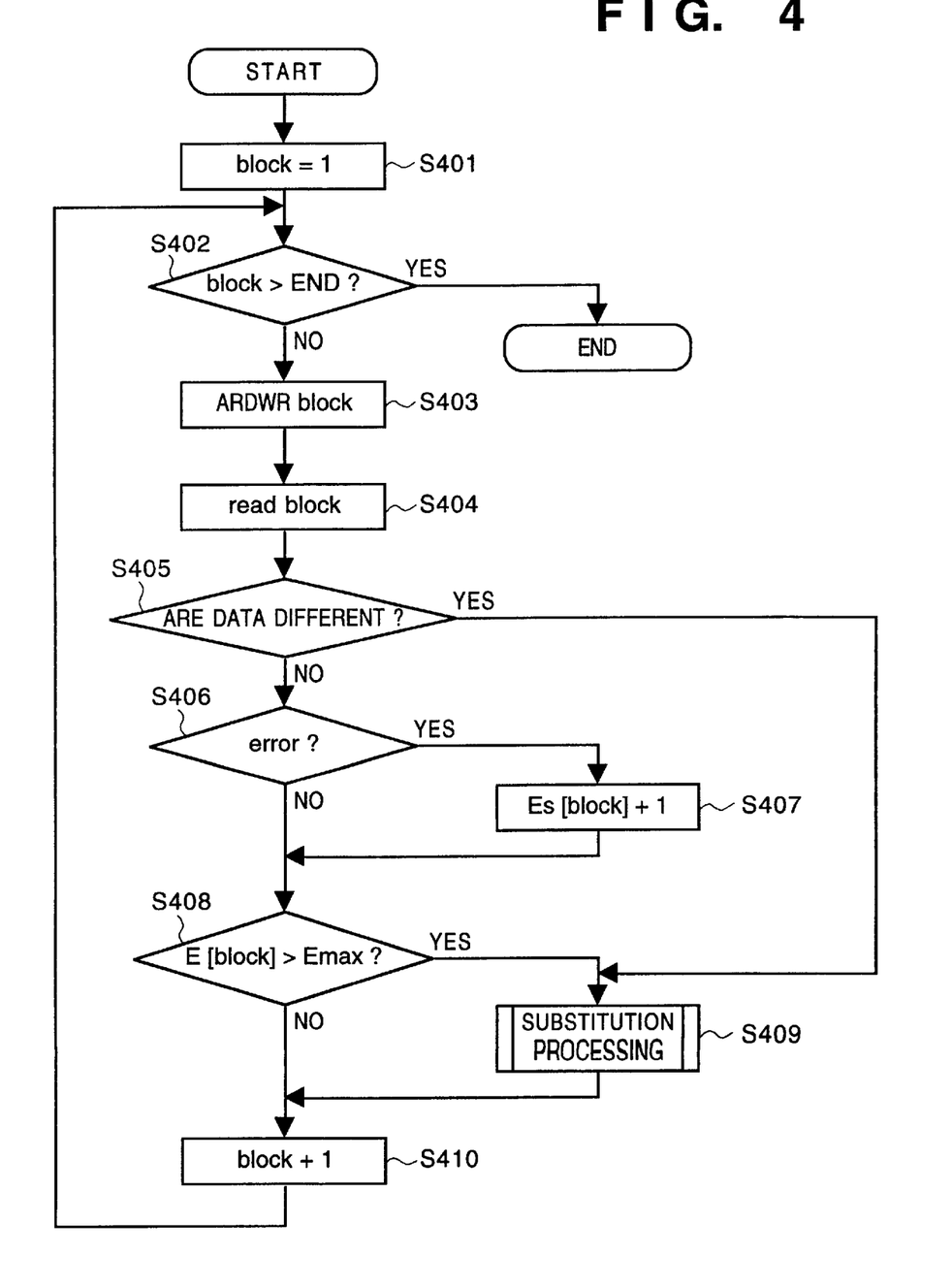
FIG. 4 is a flowchart illustrating the flow of processing executed according to a third embodiment of the invention.

FIG. 4 is a flowchart illustrating the flow of processing executed according to the third embodiment.

In response to the ARDWR instruction and a read instruction that follows the ARDWR instruction, a counter "block", which counts the numbers of the storage areas that undergo defect detection and prediction, is initialized to "1" at step S401. This is followed by step S402, at which it is determined whether all storage areas have undergone defect detection and prediction processing. If defect detection and prediction is finished up to the final storage area ("YES" at step S402), then processing is terminated. If defect detection and prediction is not finished up to the final storage area ("NO" at step S402), then the program proceeds to step S403.

At step S403, data stored in a storage area corresponding to content indicated by the counter "block" are read out by the ARDWR instruction (ARDWR block), the data are placed in a buffer temporarily and then written back to the same storage area. This is followed by step S404, at which the data stored in this storage area are read out by the read instruction (read block). Next, at step S405, with regard to data stored in a certain storage area, it is determined whether the data read out by the ARDWR instruction and the data read out by the read instruction that followed the ARDWR instruction are different. If the data are identical ("NO" at step S405), the program proceeds to step S406. If the data are different ("YES" at step S405), however, then the program proceeds to step S409.

It is determined at step S406 whether the storage area for which the data read/write operation was performed in response to the ARDWR instruction has developed a recoverable error (referred to as a "recoverable ARDWR error") owing to retry of the storage area. If such an error has occurred ("YES" at step S406), then the program proceeds to step S407. If it is found at step S406 that an error has not occurred ("NO" at step S406), then the program proceeds to step S408.

With regard to a storage area for which an error has occurred owing to the ARDWR instruction, step S407 calls for incrementing of the content (block=n, where n is the nth storage area) of an adding counter E[block] which counts up the number of times the error has occurred owing to the ARDWR instruction. Next, at step S408, it is determined whether the content of the adding counter E[block] is greater than a cumulative error count Emax that has been set in advance. If the content of the adding counter E[block] is greater than the cumulative error count Emax ("YES" at step S408), then the program proceeds to step S409, at which this storage area undergoes substitution processing. If the content of the adding counter E[block] is equal to or less than the cumulative error count Emax ("NO" at step S408), on the other hand, then the program proceeds to step S410.

The content of the counter "block" is incremented at step S410, whence the program returns to step S402. The processing described in connection with step S402~S408 is repeated until detection and prediction of occurrence of defects is finished for storage areas. When all storage areas have been subjected to detection and prediction of defect occurrence, processing is terminated.

It should be noted that the content of the adding counter E[block] may be stored in the retry-count storage area of the memory 3 shown in FIG. 1 or in a prescribed storage area of the storage device 1.

Further, the third embodiment is obtained by adding the processing of step S404 in FIG. 4 to the second embodiment. However, it is also possible to apply the processing of step S404 to the first embodiment or to other embodiments.

In accordance with the third embodiment, as described above, data stored in a storage area after execution of the ARDWR instruction can be read out again by a read instruction and these data can be compared with the data that were read out by the ARDWR instruction, thereby making possible more accurate automatic detection and prediction of occurrence of defective storage areas. If a defect is detected, substitution processing can be executed automatically.

Further, the number of times errors occur with regard to storage areas of the storage device in response to the ARDWR instruction can be stored and, if the error count exceeds a predetermined threshold value with regard to a particular storage area, this storage area can be subjected to substitution processing automatically.

As a result of the operation described above, partial defects present in the plurality of storage areas constituting the storage device 1 can be detected and predicted automatically.

The processing described in the first through third embodiments can be started up periodically at fixed intervals, such as once a day or once a week, or at start-up or shut-down of the system, by the system software or built-in firmware, or manually at the volition of the administrator.

Further, in order to avoid a decline in overall system performance owing to the processing for detecting and predicting the occurrence of defects in storage areas in accordance with the second and third embodiments, it is possible to adopt an arrangement in which the processing for detecting and predicting the occurrence of defects in storage areas is executed at a selected time, namely when the load on the system is low.

Processing executed by such an arrangement will now be described with reference to FIG. 5.

Figure 5:
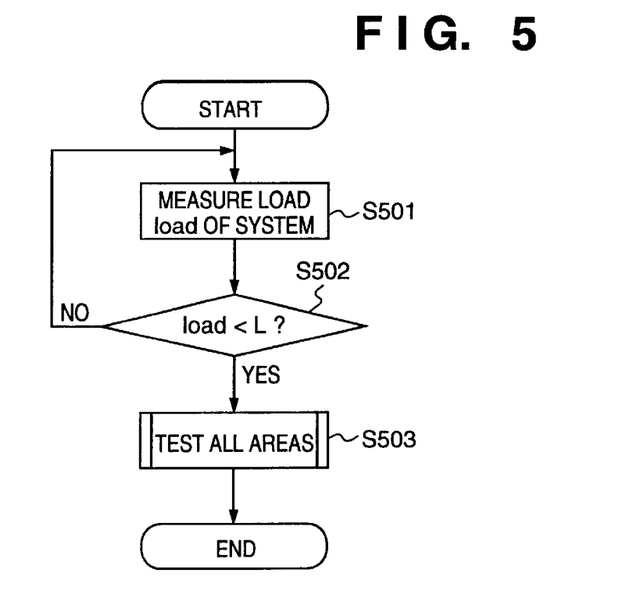
FIG. 5 is a flowchart illustrating the flow of processing executed in order to perform the processing described in connection with the second and third embodiments of the invention.

FIG. 5 is a flowchart illustrating the flow of processing executed to perform the processing described in connection with the second and third embodiments of the invention.

Step S501 in FIG. 5 calls for measurement of the load Lsys, which indicates the load on the system at a certain point in time. This is followed by step S502, at which it is determined whether Lsys is less than a predetermined constant L. If the load equal to or greater than the predetermined constant L ("NO" at step S502), the program proceeds to step S501. On the other hand, if the load is less than the predetermined constant L ("YES" at step S502), then the program proceeds to step S503. Here the occurrence of defects in the storage areas of the storage device 1 is detected and predicted using any of the arrangements of the first through third embodiments.

Thus, when the system load is high, the invention is not started up and is prevented from influencing other operations.

It is also possible to adopt an arrangement in which the occurrence of defects in the storage areas of the storage device 1 is detected and predicted depending upon overall conditions inclusive of the number of users and the present time (i.e., whether it is late at night, a holiday, etc.).

<Fourth Embodiment>

In the first through third embodiments, the occurrence of defects in the storage areas of a single storage device is detected and predicted. A fourth embodiment of the invention is adapted to detect and predict the occurrence of defects in the storage areas of a plurality of storage devices such as a disk array.

The processing executed in the fourth embodiment will now be described with reference to the flowchart of FIG. 6.

Figure 6:
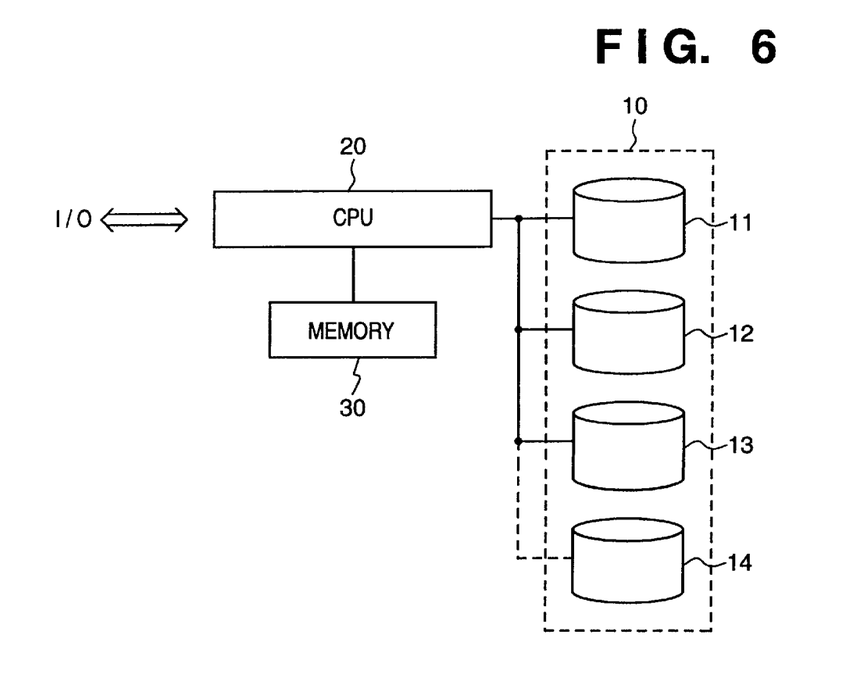
FIG. 6 is a diagram for describing processing executed according to a third embodiment of the invention.

FIG. 6 is a diagram for describing the processing executed according to the fourth embodiment.

Shown in FIG. 6 is a storage device array 10 comprising a plurality of storage devices 11~14, a CPU (central processing unit) 30 for subjecting the elements of the system to various control, and a memory 30. The memory 30 has a defect checking program (not shown) for executing processing described in the fourth embodiment, as well retry-count storage areas, the number of which correspond to the number of storage devices 11~14, for performing a function identical with that of the retry-count storage area 3b described above in connection with FIG. 1. It is assumed that the detailed construction of the storage devices 11~14 is similar to that of the conventional storage device 71 shown in FIG. 7. Further, the retry-count storage areas may be provided in individual storage areas.

If a total number of errors obtained by summing the number of errors that have occurred in each of the storage areas of any of the storages devices 11~14, or if the number of errors that have occurred in each storage area of the storage areas of any of the storages devices 11~14, exceeds a predetermined threshold value, substitution processing is executed on a per-device basis. This can be implemented by sending a message to the user or system administrator and having the user or administrator intervene, or, as shown in FIG. 6, by setting aside the storage device 14 as a spare storage device that usually is not used and executing substitution processing automatically.

In accordance with the first through fourth embodiments, as described above, the occurrence of defects in the storage areas of a storage device can be predicted and substitution processing can be executed to automatically substitute another storage area for one that has failed. This furnishes the storage device with a high reliability and makes it easy to use. Further, storage areas can be subjected to substitution processing and the save effects can be obtained even when a failure has actually occurred.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the functions according to the embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiments.

Furthermore, the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

Figure 8:
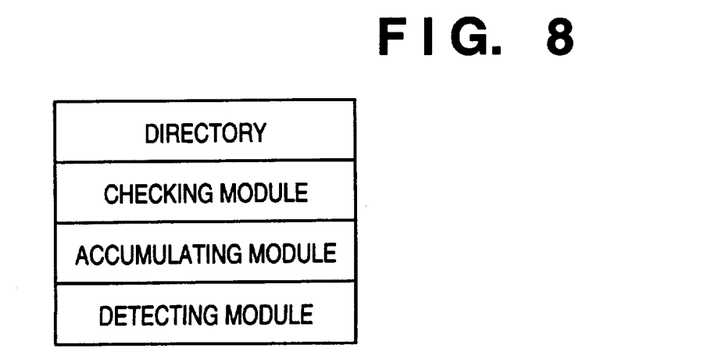
FIG. 8 is a diagram showing the structure of the memory map of a floppy disk storing a program for processing according to the present invention.

In a case where the present invention is applied to the above-mentioned storage medium, program codes corresponding to the flowcharts described earlier are stored on this storage medium. More specifically, modules illustrated in the example of the memory map of FIG. 8 are stored on the storage medium.

Specifically, it will suffice to store program codes of at least a "checking module", an "accumulating module" and a "detecting module" on the storage medium.

The "checking module" checks for defects in storage areas by performing reading and writing of data over all storages areas constituting a storage medium. The "accumulating module" is a module which, when an error that has occurred by checking, is an error for which retry is possible, accumulates the number of times this has occurred. The "detecting module" detects fault locations in the storage areas based upon the type of error that has occurred by checking or the number of occurrences accumulated by the accumulating module.

As many apparently widely different embodiments of the present invention can be made without departing from the spirit and scope thereof, it is to be understood that the invention is not limited to the specific embodiments thereof except as defined in the appended claims.

What is claimed is:

1. A storage device equipped with a storage medium, comprising:

checking means for checking for defects in storage areas by performing reading and writing of data over all storage areas constituting the storage medium, periodically at predetermined intervals;

accumulating means which, when an error that has been discovered by checking performed by said checking means is an error which can be recovered from by performing a retry, is for accumulating the number of times a recovery has occurred;

detecting means for detecting fault locations in the storage areas based upon (1) the type of error that has occurred by checking performed by said checking means, or (2) upon the number of occurrences accumulated by said accumulating means, or both; and control means for inhibiting instructions from elsewhere during execution of a set of reading and writing of data over a single storage area by said checking means and for allowing execution of the instructions from elsewhere after execution of each set of reading and writing of data over a respective one of storage areas.

2. The device according to claim 1, further comprising substitution means for substituting another storage area for a storage area having a defect detected by said detecting means.

3. The device according to claim 1, wherein said detecting means detects a storage area under examination as being a defective location if the number of occurrences accumulated by said accumulating means exceeds a predetermined number or if the error that has been discovered by checking performed by said checking means is an error which cannot be recovered from by performing a retry.

4. The device according to claim 1, wherein the storage device has a control instruction for inhibiting instructions from elsewhere during execution of a set of reading and writing of data over a single storage area by said checking means; and wherein said control means controls the storage device by using the control instruction.

5. The device according to claim 1, further comprising memory means for holding data read out by said checking means, said checking means checking for defects of the storage areas by re-reading data out of a storage area after the data has been written to the storage area by said checking means and comparing the read data and the data held by said memory means.

6. A storage system equipped with a plurality of storage devices, comprising:

checking means for checking for defects in storage areas by performing reading and writing of data over all storage areas constituting a storage medium, periodically at predetermined intervals, provided in each storage device of said plurality of storage devices;

accumulating means which, when an error that has been discovered by checking performed by said checking means is an error which can be recovered from by performing a retry, is for accumulating the number of times a recovery has occurred;

detecting means for detecting fault locations in the storage areas based upon (1) the type of error that has occurred by checking performed by said checking means, or (2) upon the number of occurrences accumulated by said accumulating means, or both;

monitoring means for monitoring status of detection of each storage device of said plurality of storage devices by said detecting means;

substitution means for substituting one storage device for another in dependence upon status of detection monitored by said monitoring means; and control means for inhibiting instructions from elsewhere during execution of a set of reading and writing of data over a single storage area by said checking means and for allowing execution of the instructions from elsewhere after execution of each set of reading and writing of data over a respective one of storage areas.

7. A method of controlling a storage device equipped with a storage medium, comprising:

a checking step, of checking for defects in storage areas by performing reading and writing of data over all storage areas constituting the storage medium, periodically at predetermined intervals;

an accumulating step, which, when an error that has been discovered by checking performed at said checking step is an error which can be recovered from by performing a retry, is a step of accumulating the number of times a recovery has occurred;

a detecting step, of detecting fault locations in the storage areas based upon (1) the type of error that has occurred by checking performed in said checking step, or (2) upon the number of occurrences accumulated in said accumulating step, or both; and a control step, of inhibiting instructions from elsewhere during execution of a set of reading and writing of data over a single storage area in said checking step and of allowing execution of the instructions from elsewhere after execution of each set of reading and writing of data over a respective one of storage areas.

8. The method according to claim 7, further comprising a substitution step, of substituting another storage area for a storage area having a defect detected at said detecting step.

9. The method according to claim 7, wherein said detecting step includes detecting a storage area under examination as being a defective location if the number of occurrences accumulated in said accumulating step exceeds a predetermined number or if the error that has occurred by checking performed in said checking step is an error for which retry is impossible.

10. The method according to claim 7, wherein the method has a control instruction for inhibiting instructions from elsewhere during execution of checking in said checking step; and wherein said control step includes controlling the storage device by using the control instruction.

11. The method according to claim 10, further comprising a data holding step, of holding data read out at said checking step, wherein said checking step includes checking for defects of the storage areas by re-reading data out of a storage area after it has been checked in said checking step and comparing the read data and the data held in said data holding step.

12. A method of controlling a storage system equipped with a plurality of storage devices, comprising:

a checking step, of checking for defects in storage areas by performing reading and writing of data over all storage areas constituting a storage medium, periodically at predetermined intervals, provided in each storage device of the plurality of storage devices;

an accumulating step, which, when an error that has been discovered by checking performed in said checking step is an error which can be recovered from by performing a retry, is a step of accumulating the number of times a recovery has occurred;

a detecting step, of detecting fault locations in the storage areas based upon (1) the type of error that has occurred by checking performed in said checking step, or (2) upon the number of occurrences accumulated in said accumulating step, or both;

a monitoring step, of monitoring status of detection of each storage device of the plurality of storage devices in said detecting step;

a substitution step, of substituting one storage device for another in dependence upon status of detection monitored at said monitoring step; and a control step, of inhibiting instructions from elsewhere during execution of a set of reading and writing of data over a single storage area by said checking step, and of allowing execution of the instructions from elsewhere after execution of each set of reading and writing of data over a respective one of storage areas.

13. A computer readable memory storing program code control processing for controlling a storage device equipped with a storage medium, the program code comprising:

program code for a checking step, of checking for defects in storage areas by performing reading and writing of data over all storage areas constituting the storage medium, periodically at predetermined intervals;

program code for an accumulating step, which, when an error that has been discovered by checking performed in said checking step is an error which can be recovered from by performing a retry, is a step of accumulating the number of times a recovery has occurred;

program code for a detecting step, of detecting fault locations in the storage areas based upon (1) the type of error that has occurred by checking performed in said checking step, or (2) upon the number of occurrences accumulated in said accumulating step, or both; and program code for a control step, of inhibiting instructions from elsewhere during execution of a set of reading and writing of data over a single storage area in said checking step, and of allowing execution of the instructions from elsewhere after execution of each set of reading and writing of data over a respective one of storage areas.

* * * * *